US006005504A

United States Patent [19]

Hirono

[11] Patent Number: 6,005,504

[45] Date of Patent: Dec. 21, 1999

[54] POSITION INFORMATION ENCODING APPARATUS AND METHOD THEREOF, POSITION INFORMATION DECODING APPARATUS AND METHOD THEREOF, AND MAP INFORMATION PROCESSING APPARATUS AND METHOD THEREOF

[75] Inventor: Chiharu Hirono, Tokyo, Japan

[73] Assignee: Sony Corporation, Tokyo, Japan

[21] Appl. No.: 09/009,238

[22] Filed: Jan. 20, 1998

[30] Foreign Application Priority Data

Jan. 23, 1997 [JP] Japan .................................. P9-010127

[51] Int. Cl.$^6$ ...................................................... G06F 19/00

[52] U.S. Cl. ................................................ 341/83; 341/67

[58] Field of Search ................................ 341/83, 65, 67, 341/50; 342/350

[56] References Cited

U.S. PATENT DOCUMENTS 4,951,211 8/1990 De Villeroche ......................... 364/444

5,592,172 1/1997 Bailey et al. ........................... 342/350

*Primary Examiner*—Brian Young

*Assistant Examiner*—Peguy JeanPierre

*Attorney, Agent, or Firm*—Jay H. Maioli

[57] ABSTRACT

A map information server is disposed on the Internet, and when a position on a page is input, the map information server searches latitude information and longitude information corresponding to the position, encodes the latitude information and longitude information to a character string corresponding to a predetermined rule, and displays the resultant character string. When an encoded character string of latitude information and longitude information is input, the map information server searches the position corresponding to the latitude information and longitude information and displays the position on a map. In addition, when latitude information and longitude information are input, the map information server encodes the latitude information and longitude information to a code of a character string corresponding to a predetermined rule. When an encoded character string of latitude information and longitude information is input, the map information server decodes the character string to latitude information and longitude information. As position information, since an encoded character string of latitude information and longitude information is used, the number of codes is decreased. Thus, the position information can be easily sent.

32 Claims, 5 Drawing Sheets

POSITION INFORMATION ENCODING APPARATUS AND METHOD THEREOF, POSITION INFORMATION DECODING APPARATUS AND METHOD THEREOF, AND MAP INFORMATION PROCESSING APPARATUS AND METHOD THEREOF

BACKGROUND OF THE INVENTION

1. Field of the Invention

The present invention relates to a position information encoding apparatus and a method thereof, a position information decoding apparatus and a method thereof, and a map information processing apparatus and a method thereof suitable for searching map information and related information through the Internet.

2. Description of the Related Art

The Internet has a service called WWW (World Wide Web) that allows a user to search multimedia information through the network thereof with hypertext that links text information, image information, audio information, and so forth. With the WWW, various types and huge amounts of information including shopping information and restaurant information are provided. In addition, home pages of the WWW are being published by public organizations (such as governments and local governments), small companies, small stores, and individuals. It is expected that services using the WWW will drastically grow in the future.

With services of the WWW, the user can easily obtain shopping information, event information, and so forth. However, to get to stores and event places corresponding to the obtained information, the user needs to obtain position information thereof. To provide the user with shopping information and event information on the WWW, it is necessary to add information of the locations of the stores and event places.

To do that, WWW pages may have map information of the locations of event places and stores. Since the WWW can handle hypertext, maps of the locations of the stores and event places can be published as map information. When the maps of the locations of the stores and event places are published as image information, the user can reference the map information to get to the desired store and event place.

However, the roads and geographical structures are very complicated. Thus, it is very troublesome for publishers of WWW pages to draw maps for the stores and event places and to paste them to relevant pages. In addition, new roads and buildings are being built and old buildings are being demolished day by day. Thus, the roads and buildings are being changed day by day. In other words, the maps that the publishers of the WWW pages drew may be inaccurate when the user sees them.

In addition, information that represents the locations of event places and stores (for example, latitude information and longitude information thereof) may be placed in such WWW pages. With the latitude information and longitude information, the user can get to the desired event places and stores with reference to the maps. Alternatively, application programs of personal computers and car navigation systems that display maps corresponding to latitude information and longitude information that users input are known. Thus, with such application programs and car navigation systems, the users can search locations on maps with the latitude information and longitude information.

However, it is very troublesome for the users to check out the locations of the event places and stores on the maps with the latitude information and longitude information. In addition, to search the event places and stores with the latitude information and longitude information, the latest and accurate maps should be prepared. With the application programs of the personal computers and the car navigation systems, the users can search the positions of the event places and stores on the maps with the latitude information and longitude information. However, such application programs and car navigation systems are expensive and difficult to deal with changes of roads and buildings.

To solve this problem, a WWW site that provides users with a map information service that searches a map corresponding to input position information and displays the position on the map may be provided on the Internet. With such a WWW site, a user who obtained a store or an event place from a relevant WWW page can easily know the position thereof on the map. In addition, since such a WWW site constantly updates map data, it can deal with changes of roads and buildings.

Such a WWW site that provides the user with map information may use latitude information and longitude information as position information. The latitude represents the angular distance north or south from the earth's equator measured through 90 degrees. The southern hemisphere of the earth is referred to as south latitude, whereas the northern hemisphere of the earth is referred to as north latitude. The longitude represents the angular distance, along the Equator, between the meridian passing through a position and, usually, the meridian of Greenwich. The eastern part of the earth is referred to as east longitude, whereas the western part of the earth is referred to as west longitude. The position information using the latitude and longitude has been generally employed for a long time.

However, it is not always said that latitude information and longitude information are the best as position information. In other words, when a user inputs position information with the keyboard, the information should be represented by a small number of codes. If the position information is represented by a small number of codes, when the user exchanges position information with others by electronic mail, telephone or the like, he or she can easily memorize it. Thus, the user can correctly input the position information without mistakes. However, the latitude information and longitude information are composed of many codes. Thus, the users tend to input the latitude information and longitude information with mistakes.

When the position of S Company is represented in the accuracy of 0.1 second, the position is at north latitude 35°, 37', 13.5" and east longitude 139°, 44', 9.6". When the user inputs the latitude information and longitude information, he or she should input 24 characters "N 35° 37' 13.5" E 139° 44' 9.6".

In addition, so far, the notation of latitude information and longitude information has not been internationally defined. In other words, the abbreviations and order of east longitude, west longitude, north latitude, and south latitude have not been standardized. In addition, since the latitude information and longitude information does not have an error detection code and/or a correction code, they do not deal with errors.

OBJECTS AND SUMMARY OF THE INVENTION

Therefore, an object of the present invention is to provide a position information encoding apparatus and a method thereof, a position information decoding apparatus and a method thereof, and a map information processing apparatus and a method thereof suitable for easily and accurately sending position information on the Internet.

A first aspect of the present invention is a position information encoding apparatus, comprising a means for inputting latitude information and longitude information, a means for encoding the latitude information and longitude information to a code of a character string corresponding to a predetermined rule, and a means for outputting the codes of the encoded character string of the latitude information and longitude information.

A second aspect of the present invention is a position information encoding method, comprising the steps of inputting latitude information and longitude information, encoding the latitude information and longitude information to a code of a character string corresponding to a predetermined rule, and outputting the code of the encoded character string of the latitude information and longitude information.

A third aspect of the present invention is a position information decoding apparatus, comprising a means for inputting an encoded code of a character string of latitude information and longitude information corresponding to a predetermined rule, a means for decoding the encoded code of the character string to the latitude information and longitude information corresponding to the predetermined rule, and a means for outputting the decoded latitude information and longitude information.

A fourth aspect of the present invention is a position information decoding method, comprising the steps of inputting an encoded code of a character string of latitude information and longitude information corresponding to a predetermined rule, decoding the encoded code of the character string to the latitude information and longitude information corresponding to the predetermined rule, and outputting the decoded latitude information and longitude information.

A fifth aspect of the present invention is a map information processing apparatus, comprising a means for designating a predetermined position on a map, a means for encoding latitude information and longitude information corresponding to the predetermined position on the map to a code of a character string corresponding to a predetermined rule, and a means for outputting the encoded code of the character string code of the latitude information and longitude information.

A sixth aspect of the present invention is a map information processing method, comprising the steps of when a predetermined position is designated on a map, encoding latitude information and longitude information corresponding to the predetermined position on the map to a code of a character string corresponding to a predetermined rule, and outputting the encoded code of the character string code of the latitude information and longitude information.

A seventh aspect of the present invention is a map information processing apparatus, comprising a means for inputting an encoded code of a character string of latitude information and longitude information corresponding to a predetermined rule, a means for decoding the encoded code of the character string to the latitude information and longitude information corresponding to the predetermined rule, and a means for outputting a position on a map corresponding to the decoded latitude information and longitude information.

An eighth aspect of the present invention is a map information processing method, comprising the steps of inputting an encoded code of a character string of latitude information and longitude information corresponding to a predetermined rule, decoding the encoded code of the character string to the latitude information and longitude information corresponding to the predetermined rule, and outputting a position on a map corresponding to the decoded latitude information and longitude information.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Figure 1:
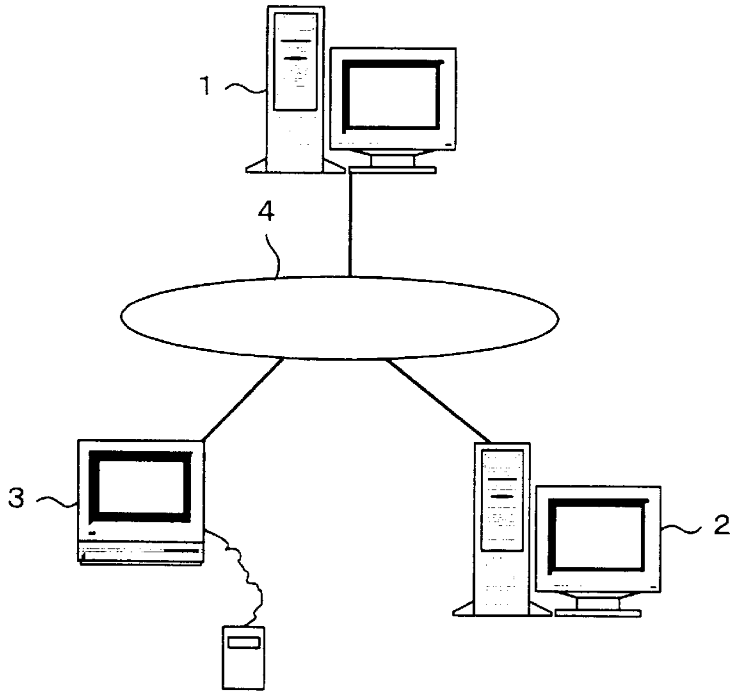
FIG. 1 is a block diagram for explaining an embodiment of the present invention.

Next, with reference to the accompanying drawings, an embodiment of the present invention will be described. According to the present invention, latitude information and longitude information are encoded to a code of a character string. With the code, position information is transmitted on the Internet. FIG. 1 is a schematic diagram showing an example of the system according to the present invention. In this example, guide information is published on the Internet. Position information of the positions of event places and stores in the guide information is published as codes of character strings. With the codes of character strings, a map information server displays the positions of the event places and stores on maps.

In FIG. 1, reference numeral 1 is a map information server. Reference numeral 2 is a guide information server. Reference numeral 3 is a user terminal unit. The map information server 1, the guide information server 2, and the user terminal 3 are connected through Internet 4.

The map information server 1 operates a site that publishes map information on the WWW. The WWW is a service of the Internet that allows a user to search multimedia information through the network thereof with hypertext that links text information, image information, audio information, and so forth. To use the WWW, the user uses an application program called browser. On the WWW, with hypertext, a WWW page can be easily linked to another site, a Gopher server, and an FTP server.

The map information server 1 stores map information corresponding to position information. The map information stored in the map information server 1 is constantly updated so that it accords with map information that changes day by day.

When a position is input on a map, the map information server 1 searches latitude information and longitude information corresponding to the position, encodes the latitude information and longitude information into a character string, and outputs the resultant character string. In contrast, when an encoded character string of latitude information and longitude information is input, the map information server 1 searches the position corresponding to the encoded character string and outputs the position on a map.

In addition, when latitude information and longitude information are input, the map information server 1 encodes the latitude information and longitude information to a code of a character string corresponding to a predetermined rule. In contrast, when an encoded character string of latitude information and longitude information is input, the map information server 1 decodes the encoded character string into latitude information and longitude information.

In such a manner, the map information server 1 uses an encoded character string of latitude information and longitude information. With the encoded character string of latitude information and longitude information, the number of codes can be decreased. Thus, the position information can be easily transmitted.

The guide information server 2 publishes a guide information on the WWW. The guide information server 2 stores guide information such as event information and shopping information.

When position information of event places and stores is added to the guide information, the position information is placed in a WWW page of the guide information server 2. As the position information, an encoded character string of latitude information and longitude information is used. The map information server 1 obtains the encoded character string of the latitude information and longitude information.

In other words, to place position information in the guide information server 2, the publisher of the guide information server 2 opens the site of the map information server 1. When the site of the map information server 1 is opened, a map screen is displayed. The publisher of the guide information server 2 designates positions of event places and stores on the map screen. Thereafter, the map information server 1 obtains the latitude information and longitude information, encodes the latitude information and longitude information to a character string, and sends the character string to the guide information server 2. The publisher of the guide information server 2 places the encoded character string of the latitude information and longitude information in a guide information page.

When the user of the user terminal unit 3 wants to obtain guide information, he or she opens a WWW page of the guide information server 2 and searches desired guide information from the WWW page of the guide information server 2. When the guide information has position information, the user can obtain the position information of the event places and stores from the guide information.

As described above, the position information is an encoded character string of latitude information and longitude information. The position of the event place or store on the map corresponding to the encoded character string of the latitude information and longitude information is obtained by the map information server 1.

In other words, when the user of the user terminal unit 3 obtains a particular position on a map with the encoded character string of the latitude information and longitude information, he or she opens a search page of the map information server 1 and inputs the encoded character string of the latitude information and longitude information. When the user inputs the encoded character string of the latitude information and longitude information, the map information server 1 decodes the encoded character string to the latitude and longitude and searches the position corresponding to the latitude and longitude on the map. The map information server 1 sends data corresponding to the position on the map to the user terminal unit 3. Thus, the user terminal unit 3 displays the position on the screen.

On the WWW, a WWW page of the guide information server 2 can be linked to the map information server 1. Thus, the user of the user terminal unit 3 can seamlessly turn a page of the guide information server 2 to a page of the map information server 1.

Figure 2:
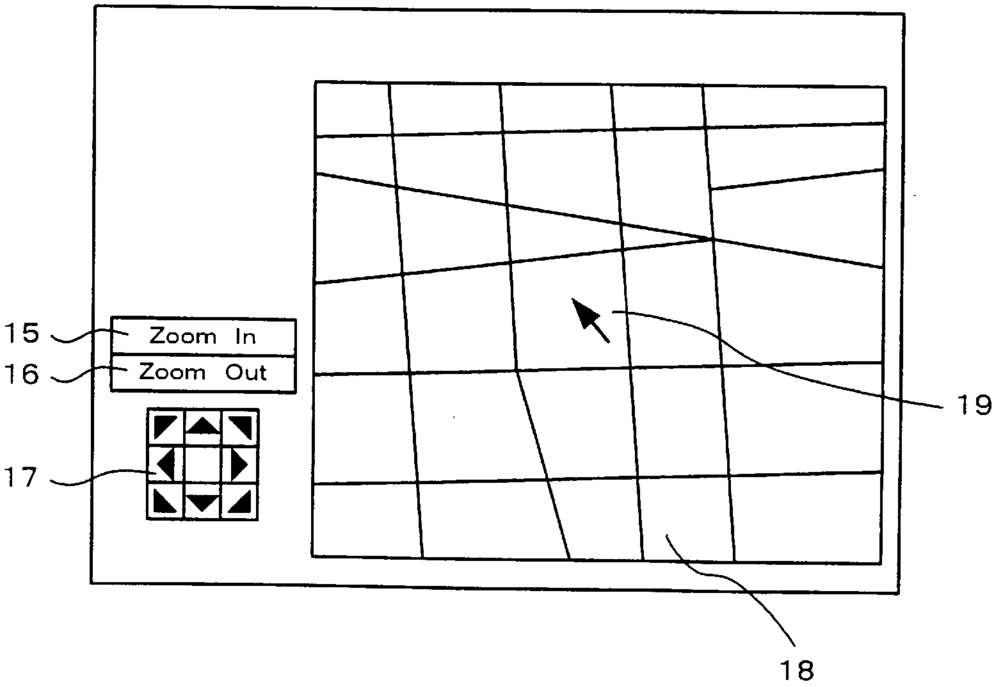
FIG. 2 is a schematic diagram for explaining a screen display according to the embodiment of the present invention.
Figure 5:
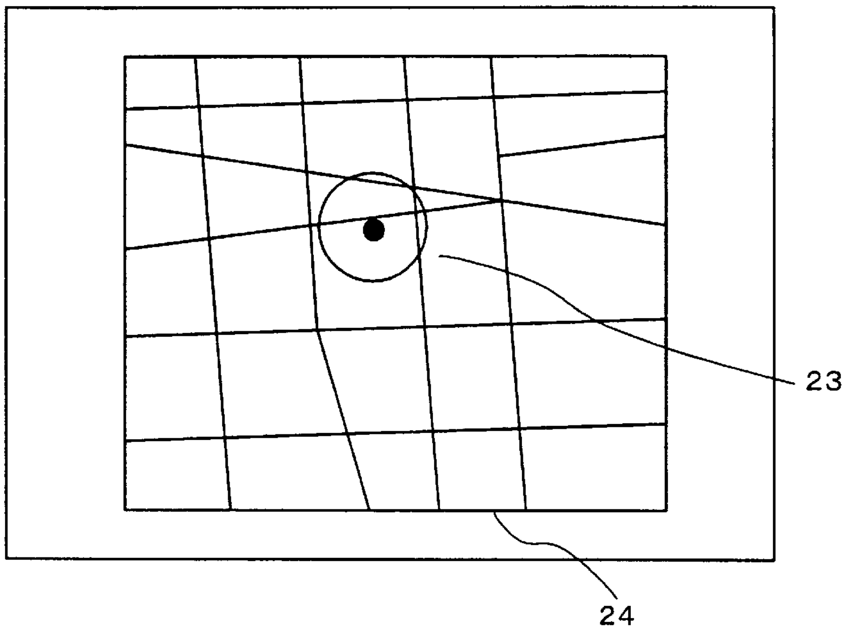
FIG. 5 is a schematic diagram for explaining a screen display according to the embodiment of the present invention.

As described above, when a position is input on a map, the map information server 1 searches latitude information and longitude information corresponding to the position, encodes the latitude information and longitude information to a character string corresponding to a predetermined rule, and outputs the resultant character string. In contrast, when an encoded character string of latitude information and longitude information is input, the map information server 1 searches the position corresponding to the encoded character string, and outputs the position on a map. FIGS. 2 and 5 show examples of screens corresponding to services of the map information server 1.

Figure 3:
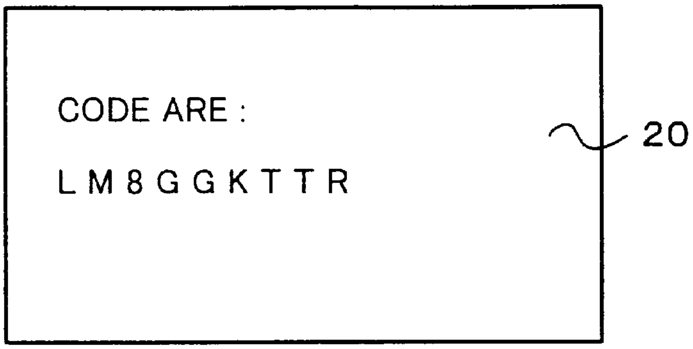
FIG. 3 is a schematic diagram for explaining a screen display according to the embodiment of the present invention.

FIGS. 2 and 3 show screens in the case that a position is input on a map and thereby an encoded character string of latitude information and longitude information is obtained. When the user obtains an encoded character string of latitude information and longitude information corresponding to the position, an image corresponding to a screen shown in FIG. 2 is sent from the map information server 1.

As shown in FIG. 2, the screen is composed of a zoom-in button 15, a zoom-out button 16, a move button 17, and a map display screen 18. With a pointing device such as a mouse, when the user moves a cursor 19 to the zoom-in button 15 or the zoom-out button 16 and clicks the zoom-in button 15 or the zoom-out button 16, the scale of the map changes and thereby the map screen enlarges or reduces. In addition, when the user moves the cursor 19 to a desired arrow portion of the move button 17 and clicks it, he or she can move the map corresponding to the arrow direction.

When the user wants to know the latitude information and longitude information of the character string corresponding to the position, he or she operates the zoom-in button 15, the zoom-out button 16, and/or the move button 17 so that a map corresponding to the desired position appears. Next, the user moves the cursor 19 to the desired position on the map and clicks it with the mouse. When the user clicks the desired position with the mouse, the map information server 1 searches the latitude and longitude corresponding to the desired position and encodes the values of the latitude and longitude to a code of a character string corresponding to a predetermined rule. The encoded code of the character string is displayed as an encoded character string 20 on the screen.

Figure 4:
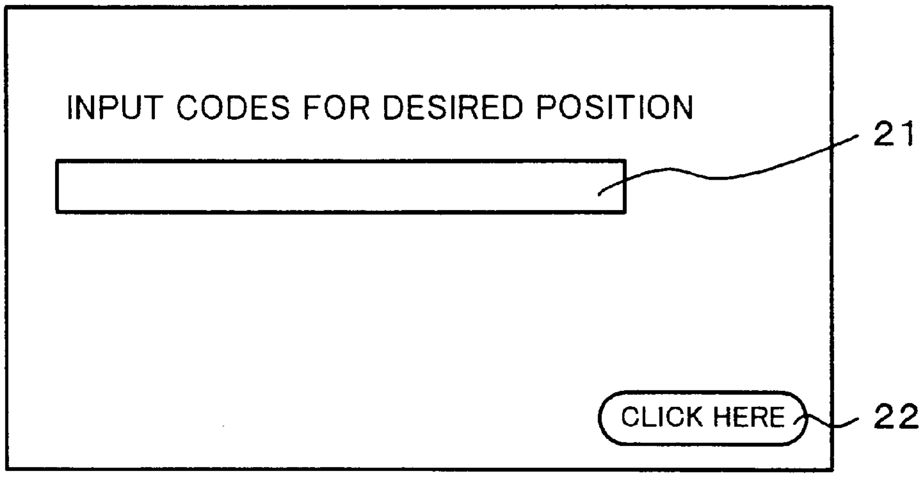
FIG. 4 is a schematic diagram for explaining a screen display according to the embodiment of the present invention.

When the user obtains a position on a map with an encoded code of a character string of latitude information and longitude information, he or she receives a search screen shown in FIG. 4 from the map information server 1. Referring to FIG. 4, the search screen is composed of a character input area 21 for a character string to be searched and a map display button 22 for causing a map to be displayed. When the user obtains a position on a map with a code of a character string of latitude information and longitude information, he or she inputs the encoded character string of latitude information and longitude information to the character input area 21 and presses the map display button 22. When the user presses the map display button 22, the map information server 1 searches the position on the map corresponding to the encoded character string. As shown in FIG. 5, the position on the map is displayed as a mark 23 on a map display screen 24.

Next, a process for encoding latitude information and longitude information to a character string will be described. In this example, available characters of which latitude information and longitude information are encoded to a character string are limited to numeric characters, uppercase alphabetic characters, and "=" so as to prevent a code from being incorrectly sent by voice mail and telephone.

In other words, when the user tries to send codes including such as "*" and "%" other than alphanumeric characters, he or she has difficulty to pronounce such codes. In addition, when uppercase characters are distinguished from respective lowercase characters, the user often mistakes uppercase characters from lowercase characters or vice versa.

Numeric characters consist of ten characters "0" to "9". Alphabetic characters consist of 26 characters "A" to "Z". In addition, in this example, a symbol "=" is used. Thus, the number of types of characters that can be encoded is (10+26+1=37) characters.

On the other hand, the values of angles of the latitude and longitude range from 0 to 360°. In the longitudinal direction, the west longitude 180° is defined as 0°, the longitude 0° as 180°, and the east longitude 180° as 360°. In the latitudinal direction, the south latitude 90° is defined as 0°, the latitude 0° as 90°, and the north latitude 90° as 180°.

When the value of the angle of the longitude is represented in the accuracy of 0.1 second, the maximum value (360°) of the longitude is represented as follows.

$$360\times60\times60\times10=12960000$$

This value is represented in hexadecimal notation as follows.

12960000=C5C100h (where h represents hexadecimal notation)

The value is represented in decimal notation as follows.

110001011100000100000000

Thus, to represent the longitude, 24 bits are required.

Likewise, when the value of the angle of the latitude is represented in the accuracy of 0.1 second, the maximum value (180°) of the latitude is represented as follows.

$$180\times60\times60\times10=6480000$$

The value is represented in hexadecimal notation as follows.

6480000=62E080h

The value is represented in decimal notation as follows.

11000101110000010000000

Thus, to represent the latitude, 23 bits are required.

Figure 6:
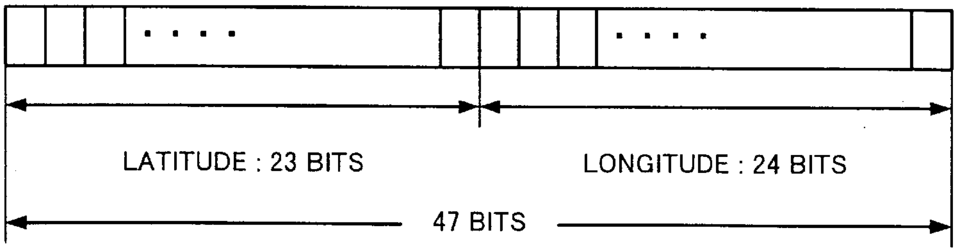
FIG. 6 is a schematic diagram for explaining the embodiment of the present invention.

When the values of the latitude and longitude are encoded to character strings, these values are represented in decimal notation. As shown in FIG. 6, the character strings are substituted with one value whose high order bits represent the value of the latitude and whose low order bits represent the value of the longitude. Since the value of the latitude is composed of 23 bits and the value of the longitude is composed of 24 bits, when the value of the latitude in binary notation and the value of the longitude in binary notation are combined, the resultant value is composed of:

$$24+23=47\text{bits}$$

At this point, the maximum value of the high order bits (23 bits) is 62E080h, whereas the maximum value of the low order bits (24 bits) is C5C100h. Thus, the combined value is as follows.

62E080C5C100h

As described above, since the character string that is used is composed of a total of 37 types of characters that are 10 numeric characters "0" to "9", 26 alphabetic characters "A" to "Z", and one symbolic character "=", the number of digits necessary to represent the 37 types of characters is given as follows.

(log 62E080C5C100h)/(log 37)=8.95056 . . .

Thus, the maximum value can be represented by 9-digit characters.

As described above, the values of the latitude and longitude can be represented by a 9-digit code with a total of 37 types of characters that are 10 numeric characters "0" to "9", 26 alphabetic characters "A" to "Z", and one symbolic character "=".

Figure 7:
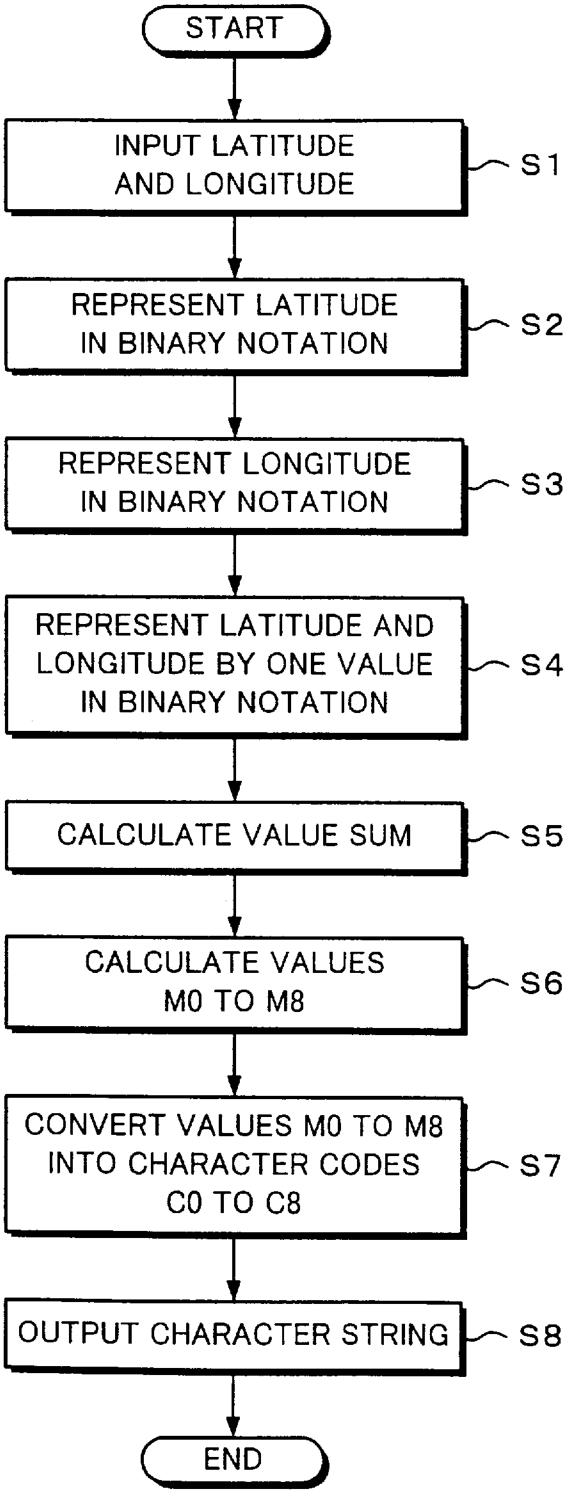
FIG. 7 is a flow chart for explaining the embodiment of the present invention.

The values of the latitude and longitude are encoded by a process shown in FIG. 7. First, values of the latitude and longitude are input (at step S1). The value of the latitude is represented by 23 bits in binary notation (at step S2). The value of the longitude is represented by 24 bits in binary notation (at step S3). A value whose high order bits represent the value of the latitude in binary notation and whose low order bits represent the value of the longitude in binary notation is obtained (at step S4).

Now, the value of the latitude in binary notation is represented by lat. The value of the longitude in binary notation is represented by long. In addition, the value whose high order bits represent the latitude and whose low order bits represent the longitude is represented by sum. Since the value of the longitude is composed of 24 bits, the value sum can be represented as follows.

$$\text{sum}=2^{24}\times\text{lat}+\text{long (at step S5)}$$

To represent the value sum with 37 types of characters (namely, the value sum is represented in 37-base notation), the value sum is divided by the n-th (where n=0 to 8) power of 37 and the remainder is truncated. The resultant value is divided by 37. With the remainder, values M0 to M8 of the digits of the character string are obtained (at step S6). In other words, the values M0 to M8 are obtained as follows.

M0=sum % 37

M1=(sum/37) % 37

M2=(sum/$37^2$) % 37

M3=(sum/$37^3$) % 37

M4=(sum/$37^4$) % 37

M5=(sum/$37^5$) % 37

M6=(sum/$37^6$) % 37

M7=(sum/$37^7$) % 37

M8=(sum/$37^8$) % 37 where "/" represents a division of which the remainder is truncated, and "%" represents an operation for obtaining the remainder.

The values M0 to M8 of individual digits are converted into character codes C0 to C8 (at step S7). In other words, C0 to C8 are obtained as follows.

C0=code (M0)

C1=code (M1)

C2=code (M2)

C3=code (M3)

C4=code (M4)

C5=code (M5)

C6=code (M6)

C7=code (M7)

C8=code (M8)

where code ( ) is a function for converting a numeric value into a character as follows.

When the value of ( ) is one of 0 to 9, the relevant numeric character of "0" to "9" is output.

When the value of ( ) is 10, the symbolic character "=" is output.

When the value of ( ) is one of 11 to 36, the relevant alphabetic character of "A" to "Z" is output.

The resultant character string is output (at step S8).

The obtained character string is output (at step S8).

When the position of S Company is represented in the accuracy of 0.1 second, the position is at north latitude 35°, 37', 13.5" and east longitude 139°, 44', 9.6". The latitude and longitude are encoded to a character string as follows.

The value sum whose high order bits represent the latitude and whose low order bits represent the longitude is represented in hexadecimal notation as follows.

sum=450161AFA2E0

With the value sum, M0 to M8 are obtained by the process at step 6. These values are substituted with the following 9-character string.

LM8GGKTTR

The latitude and longitude are represented as follows.

N 35° 37' 13.5" E 139° 44' 09.66"

Thus, 25 characters are required. However, when the latitude and longitude are encoded to a character string, the character string can be represented by nine characters.

Figure 8:
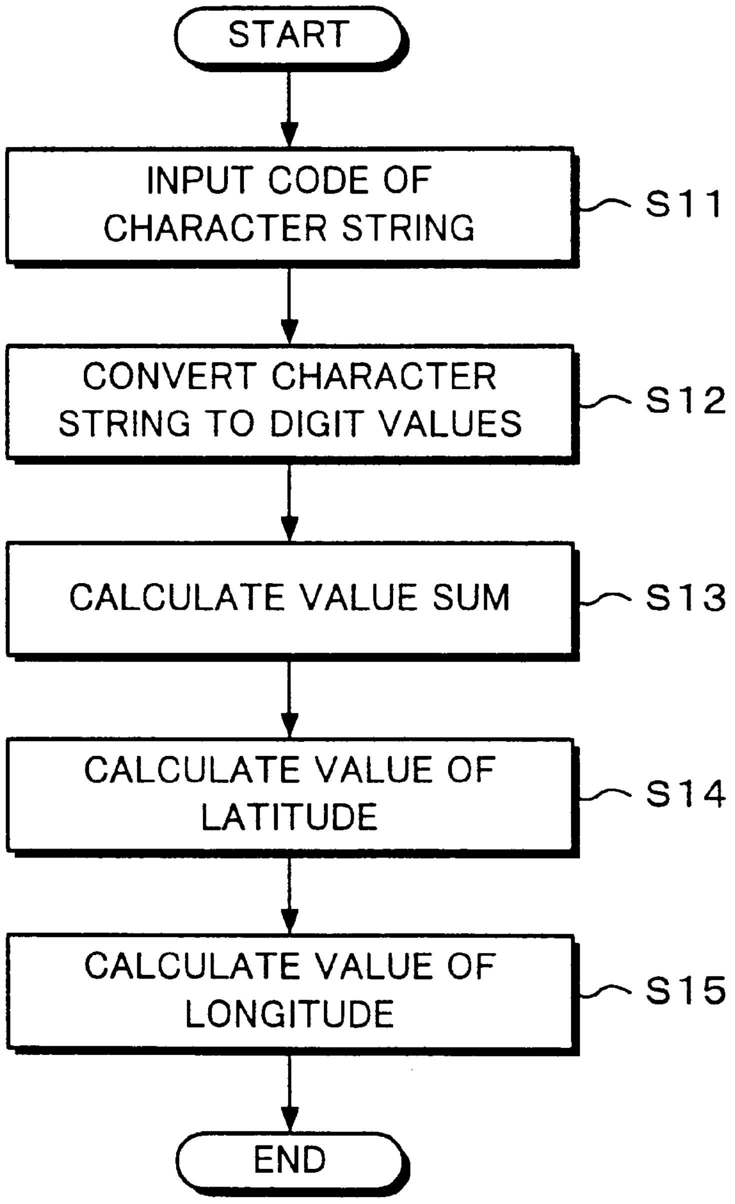
FIG. 8 is a flow chart for explaining the embodiment of the present invention.

Next, a process for decoding an encoded character string of latitude information and longitude information to the latitude and longitude will be described. FIG. 8 is a flow chart showing the decoding process. When an encoded character string of the latitude and longitude is input (at step S11), the character string is substituted with digit values thereof (at step S12). With the digit values, the value sum is obtained.

For example, the input character string is "C8 C7 C6 C5 C4 C3 C2 C1 C0". A function num ( ) that converts each digit value of the character string into a relevant value is used. When the value of ( ) is one of "0" to "9", the relevant value of 0 to 9 is output. When the value of ( ) is the symbolic character "=", 10 is output. When the value of ( ) is one of "A" to "Z", the relevant value of 11 to 36 is output. The value sum is obtained as follows at steps S12 and S13.

$$\begin{aligned}sum=&num (C0)\\&+37\times num (C1)\\&+37^2\times num (C2)\\&+37^3\times num (C3)\\&+37^4\times num (C4)\\&+37^5\times num (C5)\\&+37^6\times num (C6)\\&+37^7\times num (C7)\\&+37^8\times num (C8)\end{aligned}$$

With the value sum, the value of the latitude is obtained (at step S14) and the value of the longitude is obtained (at step S15). In other words, when the value of the latitude is represented by lat, it can be obtained as follows.

$$lat=sum/2^{24}$$

When the value of the longitude is represented by long, it can be obtained as follows.

$$long=sum \% 2^{24}$$

Thus, the values of the latitude and longitude are output (at step ST15).

When latitude information and longitude information are converted into a character string, if an error correction code or an error detection code is added, an error can be detected and corrected in the decoding process.

When the latitude information and longitude information are encoded to a character string, the number of characters can be reduced. Thus, the position information can be easily handled. In addition, when an error correction code or an error detection code is added, since occurrences of errors decrease, the reliability is improved. An encoded character string of latitude information and longitude information can be used in various manners as well as the method where it is placed on a WWW page.

As described above, when a guide information server provides position information, a WWW page contains an encoded character string of latitude information and longitude information. Alternatively, the guide information server may send an encoded character string of latitude information and longitude information to a user by electronic mail, voice mail, or the like.

In addition, it is expected that when position information is sent on another medium other than the Internet, an encoded character string of latitude information and longitude information are effectively used.

For example, with the spread of broadcast satellites, global broadcasts that cover the world have been started. In such broadcasts, a position where an incident took place and a position relating to shopping information may be sent with an encoded character string of latitude information and longitude information. When an encoded character string of latitude information and longitude information is sent in a TV broadcast, the user can easily locate a position on a map corresponding to the information received from the map information server 1.

In addition, when position information of contents of articles and advertisements is published with printed mediums such as magazines and newspapers, latitude information and longitude information as encoded character strings are effectively used.

Of course, when the user exchanges position information with other users by telephone, letter, and electronic mail, latitude information and longitude information as encoded character strings are effectively used.

According to the present invention, latitude information and longitude information are converted into a code of a character string and then sent. When the latitude information and longitude information are converted into a code of a character string, since the number of characters to be sent is decreased the user can easily memorize the code, and he or she can correctly input it without mistakes. In addition, when an error detection code or an error correction code is added, an error can be prevented from taking place.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A position information encoding apparatus comprising:

means for inputting latitude information and longitude information;

means for encoding the latitude information and longitude information into a character string in accordance with a predetermined encoding rule; and means for outputting the encoded character string of the latitude information and longitude information, wherein said means for encoding includes means for adding one of an error detection code and an error correction code to the character string when the latitude information and longitude information are encoded.

2. The position information encoding apparatus as set forth in claim 1, wherein said means for inputting includes a network through which the latitude information and longitude information are input.

3. A position information encoding apparatus comprising:

means for inputting latitude information and longitude information;

means for encoding the latitude information and longitude information into a character string in accordance with a predetermined encoding rule; and means for outputting the encoded character string of the latitude information and longitude information, wherein in the predetermined encoding rule the latitude information and longitude information are placed to different digits in a first base notation, a resultant value is represented by digit values in a second base notation, and the digit values are arranged as the encoded character string.

4. The position information encoding apparatus as set forth in claim 3, wherein the first base notation is binary notation and the second base notation is based on a predetermined number of characters.

5. A position information encoding method comprising the steps of:

inputting latitude information and longitude information;

encoding the latitude information and longitude information into a character string in accordance with a predetermined encoding rule; and outputting the encoded character string of the latitude information and longitude information, wherein the step of encoding includes adding one of an error detection code and an error correction code to the character string when the latitude information and longitude information are encoded.

6. The position information encoding method as set forth in claim 5, wherein the step of inputting includes using a network to input the latitude information and longitude information.

7. A position information encoding method comprising the steps of:

inputting latitude information and longitude information;

encoding the latitude information and longitude information into a character string in accordance with a predetermined encoding rule; and outputting the encoded character string of the latitude information and longitude information, wherein the predetermined encoding rule is that the latitude information and longitude information are placed to different digits in a first base notation, a resultant value is represented by digit values in a second base notation, and the digit values are arranged as the encoded character string.

8. The position information encoding method as set forth in claim 7, wherein the first base notation is binary notation and the second base notation is based on a predetermined number of characters.

9. A position information decoding apparatus comprising:

means for inputting an encoded character string of latitude information and longitude information encoded according to a predetermined encoding rule;

means for decoding the encoded character string to produce decoded latitude information and longitude information, the decoding corresponding to the predetermined encoding rule; and means for outputting the decoded latitude information and longitude information, wherein the means for decoding includes means for detecting and correcting an error when the latitude information and longitude information are decoded from the encoded character string.

10. A position information decoding apparatus comprising:

means for inputting an encoded character string of latitude information and longitude information encoded according to a predetermined encoding rule;

means for decoding the encoded character string to produce decoded latitude information and longitude information, the decoding corresponding to the predetermined encoding rule; and means for outputting the decoded latitude information and longitude information, wherein the predetermined encoding rule is that the latitude information and longitude information are placed to different digits in a first base notation, a resultant value is represented by digit values in a second base notation, and the digit values are arranged as the encoded character string.

11. The position information decoding apparatus as set forth in claim 10, wherein the first base notation is binary notation and the second base notation is based on a predetermined number of characters.

12. The position information decoding apparatus as set forth in claim 9, wherein the means for inputting includes a network through which the latitude information and longitude information are input.

13. A position information decoding method comprising the steps of:

inputting an encoded character string of latitude information and longitude information encoded in accordance with a predetermined encoding rule;

decoding the encoded character string to produce decoded latitude information and longitude information, the decoding corresponding to the predetermined encoding rule; and outputting the decoded latitude information and longitude information, wherein the step of decoding includes detecting and correcting an error when the latitude information and longitude information are decoded from the encoded character string.

14. A position information decoding method comprising the steps of:

inputting an encoded character string of latitude information and longitude information encoded in accordance with a predetermined encoding rule;

decoding the encoded character string to produce decoded latitude information and longitude information, the decoding corresponding to the predetermined encoding rule; and outputting the decoded latitude information and longitude information, wherein the predetermined rule is that the latitude information and longitude information are placed to different digits in a first base notation, a resultant value is represented as digit values in a second base notation, and the digit values are arranged as the encoded character string.

15. The position information decoding method as set forth in claim 14, wherein the first base notation is binary notation and the second base notation is based on a predetermined number of characters.

16. The position information decoded method as set forth in claim 14, wherein the step of inputting includes using a network through which the latitude information and longitude information are input.

17. A map information processing apparatus comprising:

means for designating a predetermined position on a map;

means for encoding latitude information and longitude information corresponding to the predetermined position on the map into an encoded character string in accordance with a predetermined encoding rule; and means for outputting the encoded character string of the latitude information and longitude information, wherein said means for encoding includes means for adding one of an error detection code and an error correction code when the latitude information and longitude information are encoded to the encoded character string.

18. The map information processing apparatus as set forth in claim 17, further comprising means for obtaining the latitude information and longitude information through a network.

19. A map information processing apparatus comprising:

means for designating a predetermined position on a map;

means for encoding latitude information and longitude information corresponding to the predetermined position on the map into an encoded character string in accordance with a predetermined encoding rule; and means for outputting the encoded character string of the latitude information and longitude information, wherein the predetermined rule is that the latitude information and longitude information are placed to different digits in a first base notation, a resultant value is represented as digit values in a second base notation, and the digit values are arranged as the encoded character string.

20. The map information processing apparatus as set forth in claim 19, wherein the first base notation is binary notation and the second base notation is based on a predetermined number of characters.

21. A map information processing method comprising the steps of:

designating a predetermined position on a map;

encoding latitude information and longitude information corresponding to the predetermined position on the map into an encoded character string in accordance with a predetermined encoding rule; and outputting the encoded character string of the latitude information and longitude information, wherein said step of encoding includes adding one of an error detection code and an error correction code when the latitude information and longitude information are encoded into the character string.

22. The map information processing method as set forth in claim 21, further comprising the step of inputting the latitude information and longitude information through a network.

23. A map information processing method comprising the steps of:

designating a predetermined position on a map;

encoding latitude information and longitude information corresponding to the predetermined position on the map into an encoded character string in accordance with a predetermined encoding rule; and outputting the encoded character string of the latitude information and longitude information, wherein the predetermined rule is that the latitude information and longitude information are placed to different digits in a first base notation, a resultant value is represented as digit values in a second base notation, and the digit values are arranged as the encoded character string.

24. The map information processing method as set forth in claim 23, wherein the first base notation is binary notation and the second base notation is based on a predetermined number of characters.

25. A map information processing apparatus comprising:

means for inputting an encoded character string of latitude information and longitude information encoded in accordance with a predetermined encoding rule;

means for decoding the encoded character string to produce decoded latitude information and longitude information, the decoding corresponding to the predetermined encoding rule; and means for outputting a position on a map corresponding to the decoded latitude information and longitude information, wherein the means for decoding includes means for detecting and correcting an error when the latitude information and longitude information are decoded from the encoded character string.

26. The nap information processing apparatus as set forth in claim 25, wherein the means for inputting includes a network through which the latitude information and longitude information are input.

27. A map information processing apparatus comprising:

means for inputting an encoded character string of latitude information and longitude information encoded in accordance with a predetermined encoding rule;

means for decoding the encoded character string to produce decoded latitude information and longitude information, the decoding corresponding to the predetermined encoding rule; and means for outputting a position on a map corresponding to the decoded latitude information and longitude information, wherein the predetermined rule is that the latitude information and longitude information are placed to different digits in a first base notation, a resultant value is represented as digit values in a second base notation, and the digit values are arranged as the encoded character string.

28. The map information processing apparatus as set forth in claim 27, wherein the first base notation is binary notation and the second base notation is based on a predetermined number of characters.

29. A map information processing method comprising the steps of:

inputting an encoded character string of latitude information and longitude information encoded in accordance with a predetermined encoding rule;

decoding the encoded character string to produce decoded latitude information and longitude information, the decoding corresponding to the predetermined encoding rule; and outputting a position on a map corresponding to the decoded latitude information and longitude information, wherein the step of decoding includes one of detecting and correcting an error when the latitude information and longitude information are decoded from the encoded character string.

30. The map information processing method as set forth in claim 29, wherein the step of inputting includes using a network through which the latitude information and longitude information are input.

31. A map information processing method comprising the steps of:

inputting an encoded character string of latitude information and longitude information encoded in accordance with a predetermined encoding rule;

decoding the encoded character string to produce decoded latitude information and longitude information, the decoding corresponding to the predetermined encoding rule; and outputting a position on a map corresponding to the decoded latitude information and longitude information, wherein the predetermined rule is that the latitude information and longitude information are placed to different digits in a first base notation, a resultant value is represented as digit values in a second base notation, and the digit values are arranged as the encoded character string.

32. The map information processing method as set forth in claim 31, wherein the first base notation is binary notation and the second base notation is based on a predetermined number of characters.

* * * * *